(12) United States Patent
Kreis et al.

(10) Patent No.: US 11,459,030 B2
(45) Date of Patent: Oct. 4, 2022

(54) APPARATUS FOR MEASURING A TORQUE IN A FORCE-FEEDBACK ACTUATOR FOR A STEER-BY-WIRE STEERING SYSTEM

(71) Applicant: VOLKSWAGEN AKTIENGESELLSCHAFT, Wolfsburg (DE)

(72) Inventors: Christopher Kreis, Braunschweig (DE); Thomas Knopp, Vechelde (DE); Peter Marx, Wasbuettel (DE); Mirko Przybylski, Braunschweig (DE); Ernst Wilske, Nedlitz (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 490 days.

(21) Appl. No.: 16/553,861

(22) Filed: Aug. 28, 2019

(65) Prior Publication Data
US 2020/0070880 A1 Mar. 5, 2020

(30) Foreign Application Priority Data
Aug. 28, 2018 (DE) ...................... 10 2018 214 538.5

(51) Int. Cl.
*B62D 6/10* (2006.01)
*B62D 5/04* (2006.01)
(Continued)

(52) U.S. Cl.
CPC ............... *B62D 6/10* (2013.01); *B62D 5/001* (2013.01); *B62D 5/0481* (2013.01); *B62D 6/007* (2013.01); *B62D 15/021* (2013.01)

(58) Field of Classification Search
CPC ........ B62D 5/001; B62D 5/0481; B62D 6/10; B62D 6/007; B62D 15/021
(Continued)

(56) References Cited

U.S. PATENT DOCUMENTS 6,799,654 B2 10/2004 Menjak et al.
6,892,605 B2 5/2005 Menjak
(Continued)

FOREIGN PATENT DOCUMENTS

DE 10051187 A1 1/2002
DE 10159330 A1 7/2002
(Continued)

*Primary Examiner* — Minnah L Seoh
*Assistant Examiner* — Felicia L. Brittman
(74) *Attorney, Agent, or Firm* — Laurence A. Greenberg; Werner H. Stemer; Ralph E. Locher

(57) ABSTRACT

An apparatus is provided for measuring a torque in a force-feedback actuator for a steer-by-wire steering system has a housing element, a control unit, a drive apparatus, and a transmission apparatus to be coupled to a steering device. At least one motion sensor detects a motion of the transmission apparatus relative to the housing element and provide a motion signal resulting from the motion to the control unit. The transmission apparatus is coupled to the housing element by way of at least one reset-reversible adjusting device which has at least one mechanical property. A torque of the transmission apparatus, and thus of a connectable steering device, may be ascertained by the control unit using the at least one mechanical property, which has at least one changing state value during the movement of the transmission apparatus, in combination with the motion signal.

8 Claims, 5 Drawing Sheets

(51) Int. Cl.
*B62D 5/00* (2006.01)
*B62D 6/00* (2006.01)
*B62D 15/02* (2006.01)

(58) Field of Classification Search
USPC .......................................................... 180/446
See application file for complete search history.

(56) References Cited

U.S. PATENT DOCUMENTS

| | | | |
|---|---|---|---|
| 7,575,092 B2 * | 8/2009 | Endo | B62D 5/008 |
| | | | 180/405 |
| 10,343,709 B2 | 7/2019 | Markfort | |
| 2002/0108804 A1 * | 8/2002 | Park | B62D 5/005 |
| | | | 180/444 |
| 2003/0164060 A1 * | 9/2003 | Menjak | B62D 5/006 |
| | | | 74/552 |
| 2007/0256885 A1 | 11/2007 | Ammon et al. | |
| 2018/0319422 A1 | 11/2018 | Polmans et al. | |
| 2019/0187742 A1 | 6/2019 | Hettegger et al. | |

FOREIGN PATENT DOCUMENTS

| | | |
|---|---|---|
| DE | 60303081 T2 | 7/2006 |
| DE | 102014222805 A1 | 5/2016 |
| DE | 102015210528 A1 | 12/2016 |
| DE | 102015213303 A1 | 1/2017 |
| DE | 102015015148 A1 | 6/2017 |
| DE | 102016015155 A1 | 11/2017 |
| EP | 1342639 A2 | 9/2003 |
| EP | 1332946 B1 | 1/2006 |
| WO | 2016198328 A1 | 12/2016 |

* cited by examiner

APPARATUS FOR MEASURING A TORQUE IN A FORCE-FEEDBACK ACTUATOR FOR A STEER-BY-WIRE STEERING SYSTEM

CROSS-REFERENCE TO RELATED APPLICATION

This application claims the priority, under 35 U.S.C. § 119, of German patent application DE 10 2018 214 538.5, filed Aug. 28, 2018; the prior application is herewith incorporated by reference in its entirety.

BACKGROUND OF THE INVENTION

Field of the Invention

The invention relates to an apparatus for measuring a torque in a force-feedback actuator for a steer-by-wire steering system.

Currently, the popular design for a passenger car steering system is an electromechanically supported steering system (EPS=Electric Power Steering). As autonomous driving and new vehicle concepts are developed, the safety architecture of these steering systems is also being further developed, so that it is becoming possible to dispense with a mechanical connection between the steering wheel and the steering system.

These steer-by-wire systems accordingly require an additional actuator. The actuator is responsible for causing the steering wheel to provide the driver with the familiar sensation of steering.

One way of implementing this is to calculate a target steering torque on a control device and apply this using an electromechanical actuator (force-feedback actuator, FFA) arranged on the driver's side of the steering column. This may include an electric motor with or without a connected gearbox.

Due to the fact that the driver reacts with great sensitivity to the steering feel, the target value must be adjusted with very high accuracy. This requires measuring the actual steering wheel torque.

Electromechanical steering systems already require equipment for measuring the steering torque.

The prior art to date includes highly diverse approaches to the topic of steer-by-wire.

U.S. Pat. No. 6,799,654 B2 and its counterpart European patent EP 1 332 946 B1, for example, disclose a hand wheel actuator. There, a steering shaft is supported by a bearing and the shaft is suitable for attaching a hand wheel. A position sensor detects an angular displacement of the steering shaft from a central position and generates a signal indicating such an angular displacement. An electric motor and a transmission apply a torque to the steering shaft to provide a force-feedback to a user. A variable stop is configured to stop the rotation of the steering shaft at any point. Measuring or calculating a torque as a function of a mechanical property is not envisioned in that case.

United States patent application US 2002/0108804 A1 discloses a steer-by-wire system. The system uses a semi-active actuator in which a wheel steering motor actuates vehicle wheels when a steering wheel is rotated. Measuring or calculating a torque as a function of a mechanical property is not envisioned in that case.

The known solutions often have a disadvantageous design of the installation space, especially if they comprise a force-feedback actuator or an alternative design with a similar function. The prior solutions often run up against their structural limits here, which cannot be reconciled with an advantageous configuration of the installation space of a force-feedback actuator.

SUMMARY OF THE INVENTION

It is accordingly an object of the invention to provide an apparatus for measuring a torque in a force-feedback actuator for a steer-by-wire steering system which overcomes the above-mentioned and other disadvantages of the heretofore-known devices and methods of this general type and which enables a particularly compact design of an overall system.

With the foregoing and other objects in view there is provided, in accordance with the invention, an apparatus for measuring a torque in a force-feedback actuator for a steer-by-wire steering system, the apparatus comprising:

a housing element, a control unit, a drive apparatus, and a transmission apparatus coupled to a steering device;

at least one motion sensor configured to detect a motion of said transmission apparatus relative to said housing element and to supply to said control unit a motion signal resulting from the motion;

at least one reset-reversible adjusting device coupling said transmission apparatus to said housing element, said at least one reset-reversible adjusting device having at least one mechanical property that changes as said transmission apparatus moves; and said control unit being configured to ascertain a torque of said transmission apparatus, and thus of the steering device coupled thereto, by using the at least one mechanical property in combination with the motion signal.

In a preferred configuration of the invention, it is envisioned that an apparatus is provided for measuring torque in a force-feedback actuator for a steer-by-wire steering system. The apparatus comprises a housing element; a control unit; a drive apparatus; a transmission apparatus, the transmission apparatus being adapted to be coupled to a steering device; at least one motion sensor adapted to detect a motion of the transmission apparatus relative to the housing element and to provide a motion signal resulting from the motion to the control unit. It is provided in this case that the transmission apparatus is coupled to the housing element with at least one reset-reversible adjusting device having at least one mechanical property, and that a torque of the transmission apparatus and thus of a connectable steering device may be ascertained by means of the control unit using the at least one mechanical property, which has at least one state value that changes when the transmission apparatus moves, together with the motion signal. In this way, it is possible to provide an apparatus for measuring a torque in a force-feedback actuator for a steer-by-wire steering system, that has a particularly compact design of an overall system. The individual components may, for example, be nested in one another or arranged compactly and functionally so that reliable measurement is guaranteed with a space-saving design. Such an apparatus can, for example, be used in all known steer-by-wire steering systems for passenger cars and commercial vehicles.

In a further preferred configuration of the invention it is provided that the reset-reversible adjusting device comprises at least one spring element and the at least one mechanical property is a stiffness of the at least one spring element. An important characteristic of such an apparatus is that the gear unit is not fixed to the housing element, but between the gear unit and the housing element at least one spring element with a known stiffness is provided. If, for example, there is a torque between the steering wheel and the electric motor in the installed state, which is supported by the housing or housing element, the transmission part or the transmission apparatus rotates by a certain angle. Since the spring stiffness c_spring is known, you may now use the equation $$M = c\_spring * angle(1) \quad (1)$$

to calculate the torque M. For this purpose, a motion sensor, for example in the form of an angle sensor, is arranged between the housing and the transmission part, with which the differential angle between the two components is determined and read into the assigned control unit or control unit. If necessary, the actual steering torque may also be calculated on this control unit using the known ratios and, if necessary, an efficiency. A changing state value may therefore be considered in connection with a bending and/or twisting of the spring element, for example.

In addition, a further preferred configuration of the invention provides that the reset-reversible adjusting device comprises at least two spring elements and the at least one mechanical property is a rigidity of the respective one spring element, wherein a torque of the transmission apparatus and thus of a connectable steering device may be determined by means of the control unit by means of a total spring rigidity of all the spring elements and the motion signal. Another special feature of the apparatus presented is that the total spring stiffness results from the stiffness of several springs arranged, for example, on a circumference of the apparatus. In this way, there may be further advantages with regard to a compact design, since, for example, the individual spring elements may be adapted in size and characteristics according to their total number.

Another preferred form of the invention also provides that the at least one motion sensor is an angle sensor. Thus a desired calculation may be carried out particularly simply and directly.

Furthermore, in a further preferred configuration of the invention, it is provided that the housing element comprises at least one stop element, the stop element being designed to block the reset-reversible adjusting device in a user-defined position when a maximum deflection value of the reset-reversible adjusting device has been reached. Thus, the components may still be designed in such a way that a contact (one or more defined stops on the housing) develops from a moment resulting from the selected spring stiffness and thus, for example, from a certain torsion angle, which leads to the fact that no further torsion may occur at this maximum measurable moment. In this way the load on the springs may be limited upwards. Furthermore, the upper limit of the measuring range is also defined.

Furthermore, in another preferred configuration of the invention, it is provided that the control unit is designed to take into account a transmission efficiency when determining the torque of the transmission apparatus and thus a connectable steering device. In a version of the apparatus, equation (1) for calculating the torque is thus extended in such a way that a gear efficiency and, if necessary, a non-linear spring characteristic curve are also taken into account:

$$M(angle) = c\_spring(angle) * angle * efficiency \quad (2)$$

Another preferred form of the invention is that the gear unit comprises a hollow gear element. The advantages mentioned above may thus be achieved even better.

Furthermore, in another preferred configuration of the invention, it is provided that the angle sensor is arranged on the housing element so that a movement of the gear unit relative to the housing element may be detected. The advantages mentioned above may thus be achieved even better.

Furthermore, in a further preferred configuration of the invention, it is provided that the spring element is a shaped leaf spring, a geometry of the shaped leaf spring being adapted in at least one partial area to at least one partial area of a geometry of a contact surface of the housing element, so that a load on the shaped leaf spring is influenced as a function of a rotation of the shaped leaf spring. The design influences the load of the springs depending on the torsion. This design thus has an influence on the resulting spring characteristic curve, since depending on the design, the springs or spring elements lie against each other at different angles of rotation depending on the torsion and are thus relieved again. In particular, such a design may contain details as described in more detail in the figure description.

Finally, another preferred form of the invention is that the spring element is either a helical spring or a form leaf spring. The advantages mentioned above may thus be achieved even better.

Unless otherwise stated in the individual case, the various forms of implementation of the invention mentioned in this application may be combined with each other to advantage.

Other features which are considered as characteristic for the invention are set forth in the appended claims.

Although the invention is illustrated and described herein as embodied in an apparatus for measuring torque in a force-feedback actuator for a steer-by-wire steering system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
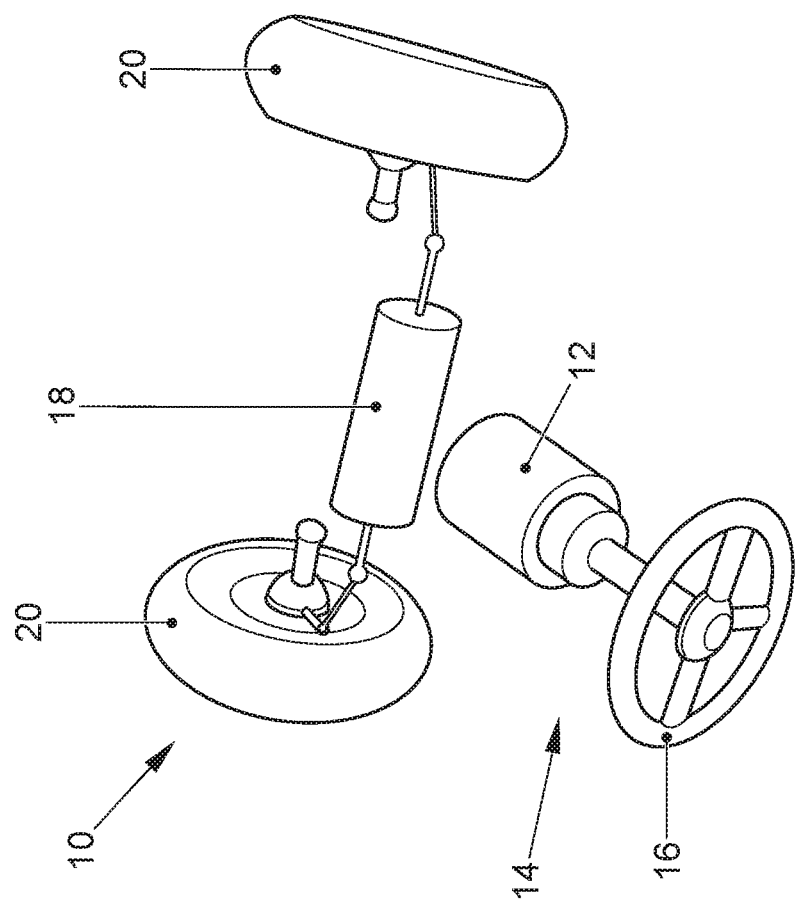
FIG. 1 is a perspective view of a steer-by-wire system without an intermediate steering shaft.

Referring now to the figures of the drawing in detail and first, particularly, to FIG. 1 thereof, there is shown a steer-by-wire system 10 without an intermediate steering shaft. This steer-by-wire-system 10 has a steering wheel actuator 12, which is coupled with a steering device 14. This steering wheel actuator 12 may, for example, include an unspecified force-feedback actuator. The steering device 14 also has a steering wheel 16. In the background of this perspective drawing, there is also shown wheel actuator 18 with wheels 20 attached at each end.

Figure 2:
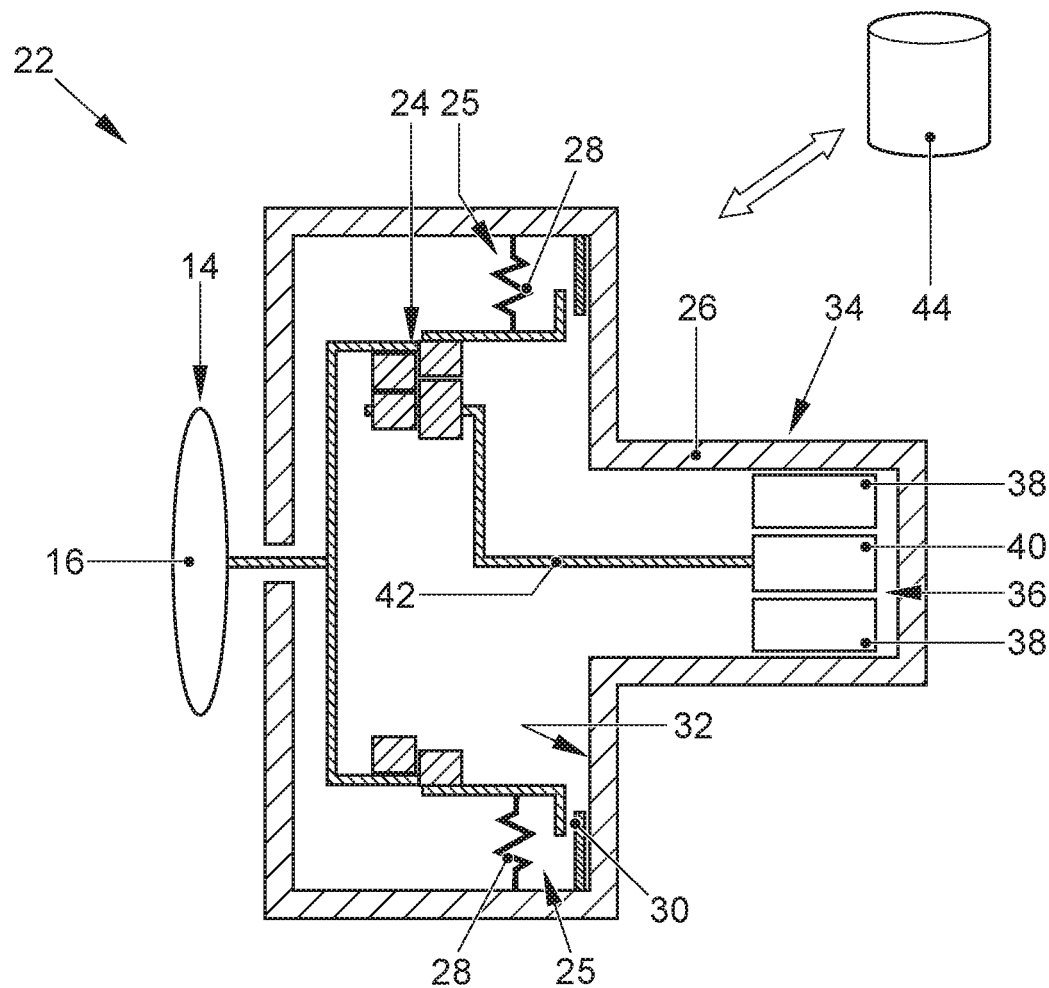
FIG. 2 is schematic sketch of an apparatus according to the invention for measuring a torque in a force-feedback actuator for a steer-by-wire steering system.

FIG. 2 shows a schematic sketch of an apparatus 22 for measuring torque in a force-feedback actuator for a steer-by-wire steering system 10. The apparatus 22 comprises a gear unit 24, or transmission apparatus 24, disposed within a housing element 26. The gear unit 24 is arranged on the housing element 26 by means of a reset-reversible adjustment apparatus 25, which comprises two spring elements 28. The spring elements 28 may be regarded as a reset-reversible adjustment device. In addition, a motion sensor 30 is provided, which may be an angle sensor, for example. The motion sensor 30 is provided on an inside 32 of the housing element 26. With respect to the image plane, a drive apparatus 36 may be seen on the right side in a narrowed area 34 of the housing element 26. The drive unit 36 shown is an electric motor and comprises both a stator 38 and a rotor 40. The drive unit 36 is functionally connected to the gear unit 24 by a coupling apparatus 42. Outside the housing element 26 a steering device 14 with a steering wheel 16 may be seen on the left in relation to the image plane. A control unit 44 is also indicated. A double block arrow indicates its functional affiliation with the apparatus 22.

Figure 3:
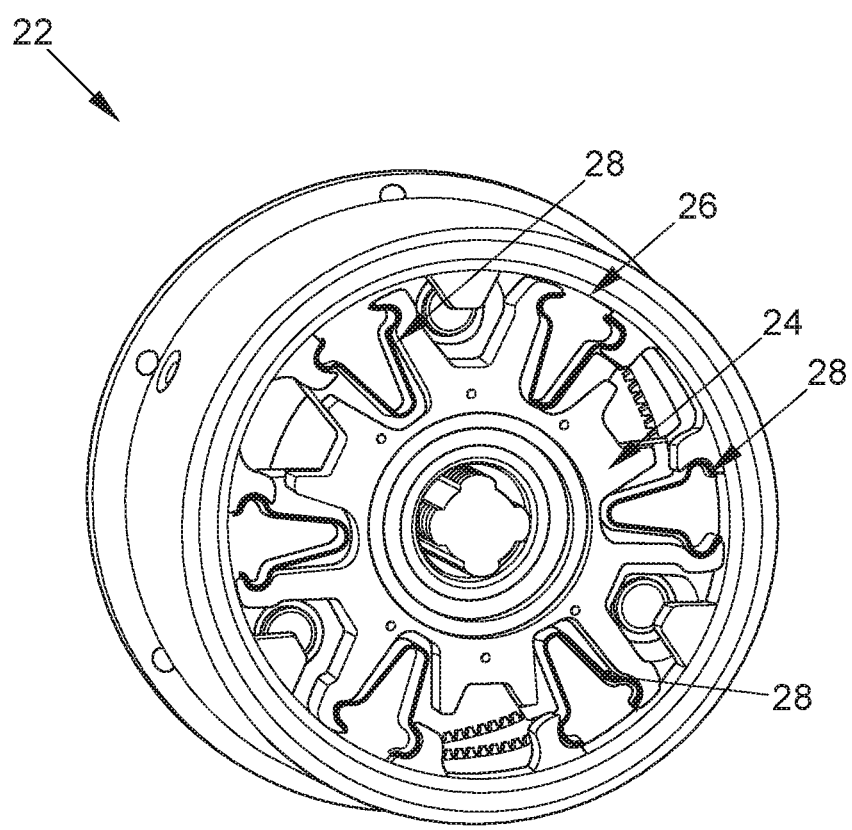
FIG. 3 is a perspective view of an apparatus for measuring a torque in a force-feedback actuator for a steer-by-wire steering system.

FIG. 3 shows a perspective view of an apparatus 22 for measuring a torque in a force-feedback actuator for a steer-by-wire steering system 10. A gear unit 24 is arranged in a housing element 26. The gear unit 24 is arranged on the housing element 26 by means of a large number of spring elements 28. The individual spring elements 28 are provided uniformly on a circumference of the apparatus 22 or between the gear unit 24 and the housing element 26. The shown geometries and dimensions are only shown as examples and may be varied at will as long as the functionality of the fixture is guaranteed.

Figure 4:
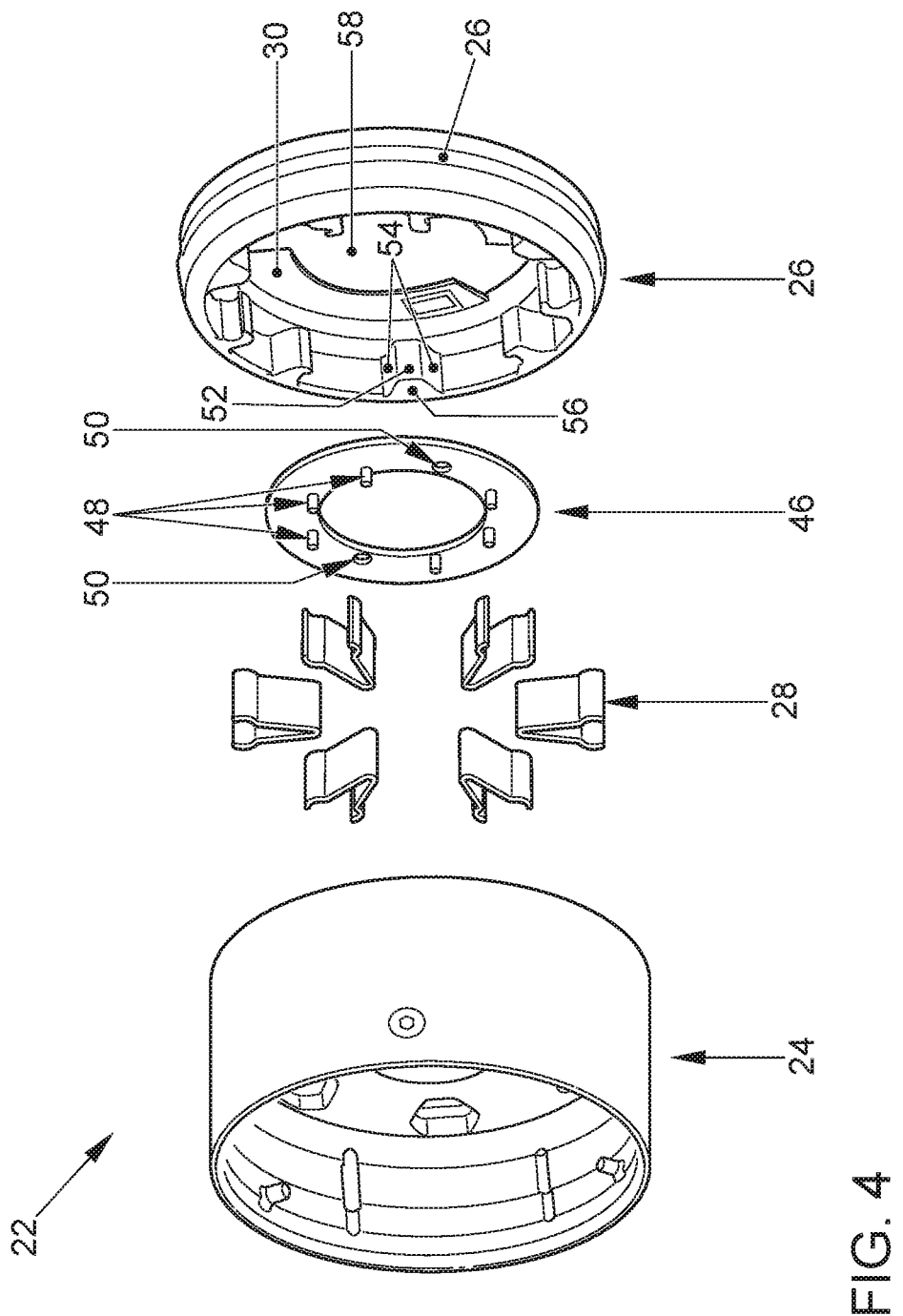
FIG. 4 is an exploded view of an apparatus for measuring a torque in a force-feedback actuator for a steer-by-wire steering system.

FIG. 4 shows an exploded view of the apparatus 22 for measuring torque in a force-feedback actuator for a steer-by-wire steering system 10. It is the same apparatus 22 as shown in FIG. 3. There is shown the housing element 26, which could also be regarded as a special gear part, and a part of the gear unit 24, which could also be regarded as a special further gear part. In addition, the individual spring elements 28 is shown. The number of six spring elements 28 shown as an example may vary as required. Depending on the number of spring elements 28, the size and stiffness may be adapted to a particular application. Between the spring elements 28 and the housing element 26, an intermediate holding apparatus 46 may also be seen, which optionally supports the functional connection between the housing element 26 and the gear unit 24 by means of the spring elements 28. The intermediate holding apparatus 46 has six supporting elements 48, which are evenly distributed around the circumference of the intermediate holding apparatus 46. In the middle of each side there are 50 holes, which may hold fasteners that are not shown in detail. A motion sensor 30 may also be seen on housing element 26. The shape and design of this motion sensor 30 are only shown as examples and may be varied at will within the framework of the functionality of the apparatus 22. The housing element 26 also has a large number of stop elements 52, each of which has two bevelled side faces 54 and one end face 56. The respective end faces 56 each point into the interior 58. The interior 58 is at least partially open, so that the housing element 26 has a shape that is substantially ring-shaped. The spring elements 28 are described in more detail in the following FIG. 5. The spring elements 28 of FIGS. 4 and 5 are identical.

Figure 5:
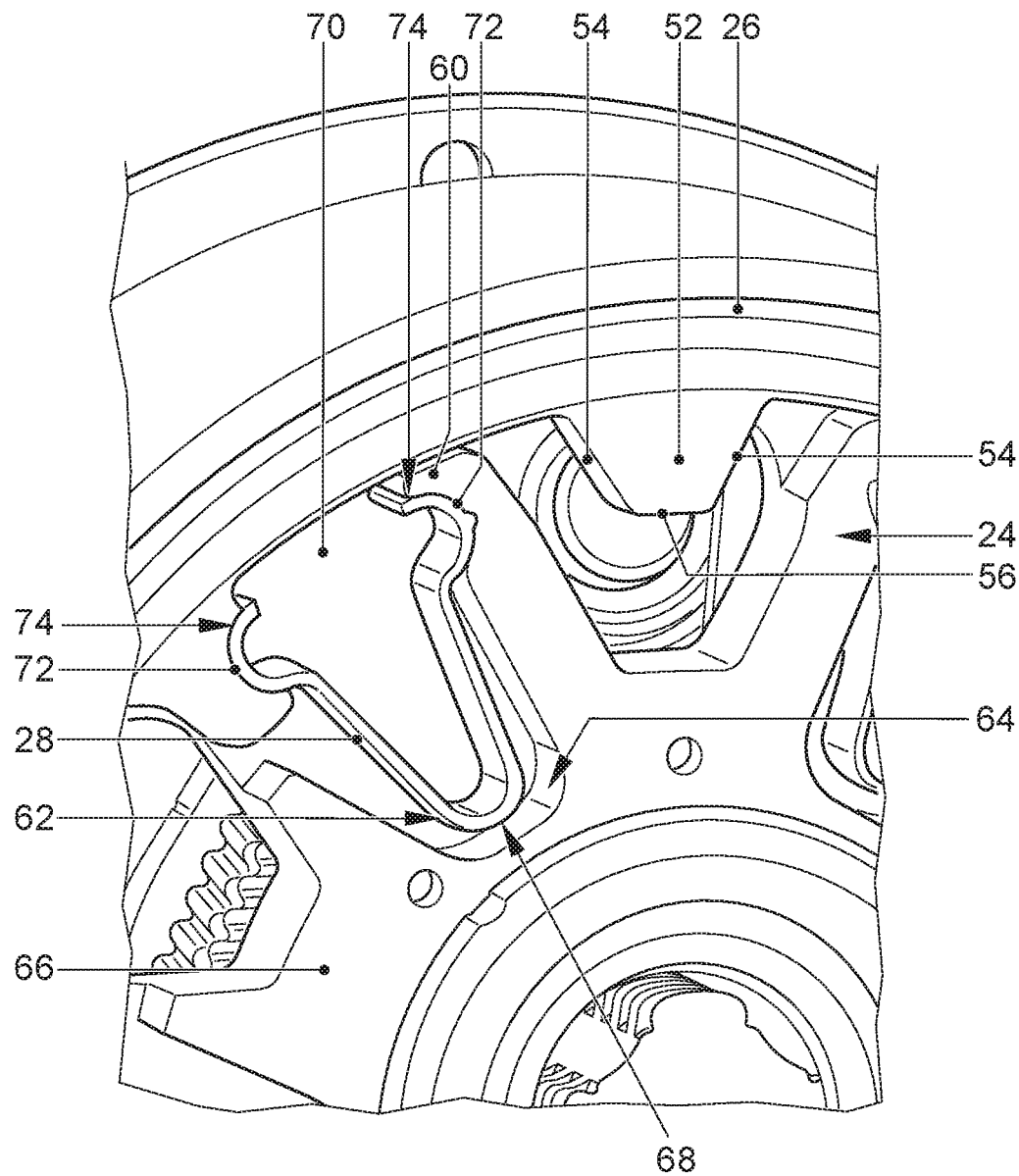
FIG. 5 is a detail of an apparatus for measuring torque in a force-feedback actuator for a steer-by-wire steering system.

FIG. 5 shows a detailed view of the apparatus 22 for measuring a torque in a force-feedback actuator for a steer-by-wire steering system 10. It is the same apparatus 22 as shown in FIGS. 3 and 4. A partial area of housing element 26 with stop element 52 may be seen. Stop element 52 has two side faces 54 and one end face 56. Furthermore, a partial area of a gear unit 24 may be detected. A support surface area element 60 is arranged on the gear unit 24, on which a spring element 28 is arranged. The spring element 28 in this case is a leaf spring, which is essentially parabolic in shape. In other words, the leaf spring is an elongated workpiece, preferably made of metal. A lower region 62 of the spring element 28 protrudes into a bulge region 64 of the transmission apparatus 24. A lower portion 62 of the spring member 28 projects into a bulge portion 64 of the gear mechanism 24, this bulge portion 64 being bounded on the right (relative to the image plane) by the contact surface member 60 and on the left by a detent member 66, the detent member 66 having a geometry mating with the stop element 52 such that the detent member 66 could receive the stop element 52 if the two were positioned relative to each other. The lower part 62 of the spring element 28 has said parabolic shape, the end part 68 being an apex of this parabolic shape. The end area 68 is at a distance from the gear unit 24 and in particular from the bulge area 64 of the gear unit 24. In the upper area 70 of the spring element 28, the parabolic shape of the spring element 28 is widened and also has on opposite sides respective essentially circular outwardly directed bulges 72, whereby on the right side the circular bulge 72 is received by a receiving area 74 of the contact surface element 60 and on the left of a further receiving area 74 of the housing element 26, so that the spring element 28 is clamped here due to its widened shape.

The following is a summary list of reference numerals and the corresponding structure used in the above description of the invention:

10 Steer-by-wire system
 12 Steering wheel actuator
 14 Steering device
 16 Steering wheel
 18 Wheel actuator
 20 Wheel
 22 Apparatus
 24 Transmission apparatus
 25 Reset-reversible adjustment device
 26 Housing element
 28 Spring element
 30 Motion sensor
 32 Inside
 34 Tapering region
 36 Drive apparatus
 38 Stator
 40 Rotor
 42 Coupling device
 44 Control unit
 46 Intermediate holding apparatus
 48 Support element
 50 Holes
 52 Stop element
 54 Side surface
 56 End face
 58 Interior
 60 Contact surface element
 62 Lower region
 64 Bulge region
 66 Latching element
 68 End region 70 Upper region
72 Bulge
74 Receiving area

The invention claimed is:

1. An apparatus for measuring a torque in a force-feedback actuator for a steer-by-wire steering system, the apparatus comprising;
a housing element;
a control unit;
a drive apparatus;
a transmission apparatus coupled to a steering device; and
at least one motion sensor configured to detect a motion of said transmission apparatus relative to said housing element and to supply to said control unit a motion signal resulting from the motion;
at least one reset-reversible adjusting device coupling said transmission apparatus to said housing element, said at least one reset-reversible adjusting device having at least one mechanical property that changes as said transmission apparatus moves;
said at least one reset-reversible adjusting device including at least one form leaf spring having a geometry adapted in at least a portion thereof to at least a partial area of a contact surface of said housing element, so that a load on said form leaf spring is influenced as a function of a rotation of said form leaf spring; and
said control unit being configured to ascertain a torque of said transmission apparatus, and thus of the steering device coupled thereto, by using the at least one mechanical property in combination with the motion signal.

2. The apparatus according to claim 1, wherein the at least one mechanical property is a stiffness of said at least one form leaf spring.

3. The apparatus according to claim 1, wherein said reset-reversible adjusting device comprises a plurality of form leaf springs and the at least one mechanical property is a stiffness of the respective one form leaf spring, and wherein said control unit is configured to determine the torque of said transmission apparatus, and of the steering device, by using a total spring stiffness of all of said form leaf springs in combination with the motion signal.

4. The apparatus according to claim 1, wherein said at least one motion sensor is an angle sensor.

5. The apparatus according to claim 1, wherein said housing element comprises at least one stop element disposed to block said reset-reversible adjusting device in a user-defined position when a maximum deflection value of said reset-reversible adjusting device is reached.

6. The apparatus according to claim 5, wherein said control unit is further configured to incorporate a transmission efficiency in determining the torque of the transmission apparatus and thus of the steering device.

7. The apparatus according to claim 1, wherein said transmission apparatus comprises a ring gear element.

8. The apparatus according to claim 1, wherein said angle sensor is arranged on said housing element to enable a movement of said transmission apparatus relative to said housing element to be detected.

* * * * *